United States Patent
Yamasaki et al.

(10) Patent No.: US 7,268,503 B2
(45) Date of Patent: Sep. 11, 2007

(54) VIBRATION LINEAR ACTUATING DEVICE, METHOD OF DRIVING THE SAME DEVICE, AND PORTABLE INFORMATION APPARATUS USING THE SAME DEVICE

(75) Inventors: Hirokazu Yamasaki, Katano (JP); Koji Kameda, Moriguchi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 451 days.

(21) Appl. No.: 10/508,992

(22) PCT Filed: Apr. 2, 2003

(86) PCT No.: PCT/JP03/04200

§ 371 (c)(1),
(2), (4) Date: Sep. 27, 2004

(87) PCT Pub. No.: WO03/085809

PCT Pub. Date: Oct. 16, 2003

(65) Prior Publication Data

US 2005/0162105 A1 Jul. 28, 2005

(30) Foreign Application Priority Data

Apr. 4, 2002 (JP) .............................. 2002-102352

(51) Int. Cl.
*H02P 1/00* (2006.01)
(52) U.S. Cl. .................. 318/114; 318/459; 318/500; 318/254; 388/928.1
(58) Field of Classification Search ............... 318/254, 318/138, 439, 114, 115, 459, 500; 388/928.1
See application file for complete search history.

(56) References Cited

U.S. PATENT DOCUMENTS

| 5,682,132 A | 10/1997 | Hidetoshi et al. |
| 6,996,228 B1* | 2/2006 | Niemitalo .............. 379/374.03 |
| 2001/0017527 A1* | 8/2001 | Lambert et al. ............ 318/114 |
| 2003/0052628 A1* | 3/2003 | Kataoka ..................... 318/114 |
| 2004/0007998 A1* | 1/2004 | Yasohara et al. ........... 318/437 |

FOREIGN PATENT DOCUMENTS

| EP | 0 726 394 A | 8/1996 |
| EP | 0 952 663 A | 10/1999 |
| JP | 11-197601 | 7/1999 |
| JP | 2000-014190 | 1/2000 |
| JP | 2001-025706 | 1/2001 |
| JP | 2001-520860 | 10/2001 |

* cited by examiner

*Primary Examiner*—Rina Duda
(74) *Attorney, Agent, or Firm*—RatnerPrestia

(57) ABSTRACT

A vibration linear actuating device includes a vibrating linear actuator and a driver (52) for driving actuator. Actuator includes mover having permanent magnet magnetized in a radial direction, stator having coil (2) and facing the permanent magnet, and elastic body for coupling stator to mover. The driver includes driving section having switching element (Q5) for powering coil (2), output controller (27) for controlling switching element (Q5), zero-cross detector (25) for detecting a zero-cross point of back electromotive force generated in coil (2) and having an output to be fed back to the output controller (27). In this structure, the driver powers coil (2) in one way to keep mover vibrating in corporation with elastic body.

21 Claims, 12 Drawing Sheets

VIBRATION LINEAR ACTUATING DEVICE, METHOD OF DRIVING THE SAME DEVICE, AND PORTABLE INFORMATION APPARATUS USING THE SAME DEVICE

THIS APPLICATION IS A U.S. NATIONAL PHASE APPLICATION OF PCT INTERNATIONAL APPLICATION PCT/JP03/04200.

TECHNICAL FIELD

The present invention relates to electromagnetic vibrators, i.e., vibration linear actuating devices, a method for driving the same devices, and portable information apparatuses using the same device. More particularly, it relates to a method for driving the electromagnetic vibrator positively in a stable manner at an inexpensive cost.

BACKGROUND ART

A vibration generator is used as a pager in portable information apparatuses such as cellular phones. A conventional vibration generator has employed a cylindrical motor equipped with an unbalancing weight. However, the cylindrical motor has a ceiling of being slimmed down, and is hard to be mounted onto a board by an automatic mounting machine. A coin-shaped motor equipped with an unbalancing weight is commercialized for overcoming the foregoing problems; however, its vibrating direction is in parallel with the printed circuit board, so that the vibration is hard to be sensed. A button-shaped vibration linear actuating device is proposed in order to generate vibrations vertical to the board; however, a greater exciting force cannot compatible with a slimmer body. A conventional vibration linear actuating device, in general, employs a push-pull driving circuit using four switching elements. This is disclosed in Japanese Patent Application Non-examined Publication No. 2001-25706.

FIG. 15 shows a circuit diagram of the conventional actuating device. Starter 61, output controller 62, driving-pulse setter 63, and driver 64 formed of four switching elements Q11-Q14 coupled together into a bridge structure. Coil 65 of the vibration actuating device is coupled to a middle point of the bridge structure, and driver 64 drives coil 65. This actuating device has numbers of elements in the driving circuit, and a movement of the mover along a positive direction or a negative direction needs to be powered every time. Thus the foregoing structure needs complicated control and consumes a lot of power.

There are other prior art disclosed in PCT International Publication No. WO99/40673, Japanese Patent Application Non-Examined Publication Nos. 2000-14190 and H11-0.197601. The present invention discloses a vibration linear actuating device, a method of driving the same device, and a portable information apparatus employing the same device that has a novel structure different from those prior art.

DISCLOSURE OF THE INVENTION

The vibration linear actuating device of the present invention comprises a vibrating linear actuator and a driver for driving the actuator. The vibrating linear actuator includes the following elements:

a mover having a permanent magnet magnetized in a radial direction;

a coil;

a stator facing the permanent magnet; and an elastic body for coupling the stator to the mover and for energizing the mover toward a center of the stator.

The driver includes the following elements:

a driving section having a switching element for powering the coil;

an output controller for controlling the switching element; and a zero-cross detector for detecting a zero-cross point of back electromotive force (BEMF) generated in the coil and for outputting a zero-cross signal.

In this structure, the driver transmits the zero-cross signal to the output controller and powers the coil in one direction, thereby vibrating the mover in cooperation with the elastic body.

The present invention further discloses a method for driving the vibration linear actuating device as well as a portable information apparatus equipped with the vibration linear actuating device.

The present invention can provide a slim and highly efficient vibration linear actuating device as well as a portable information apparatus, so that portability of the apparatus and durability of batteries are advantageously improved.

PREFERRED EMBODIMENTS OF THE INVENTION

Exemplary embodiments of the present invention are demonstrated hereinafter with reference to the accompanying drawings.

Exemplary Embodiment 1

Figure 1:
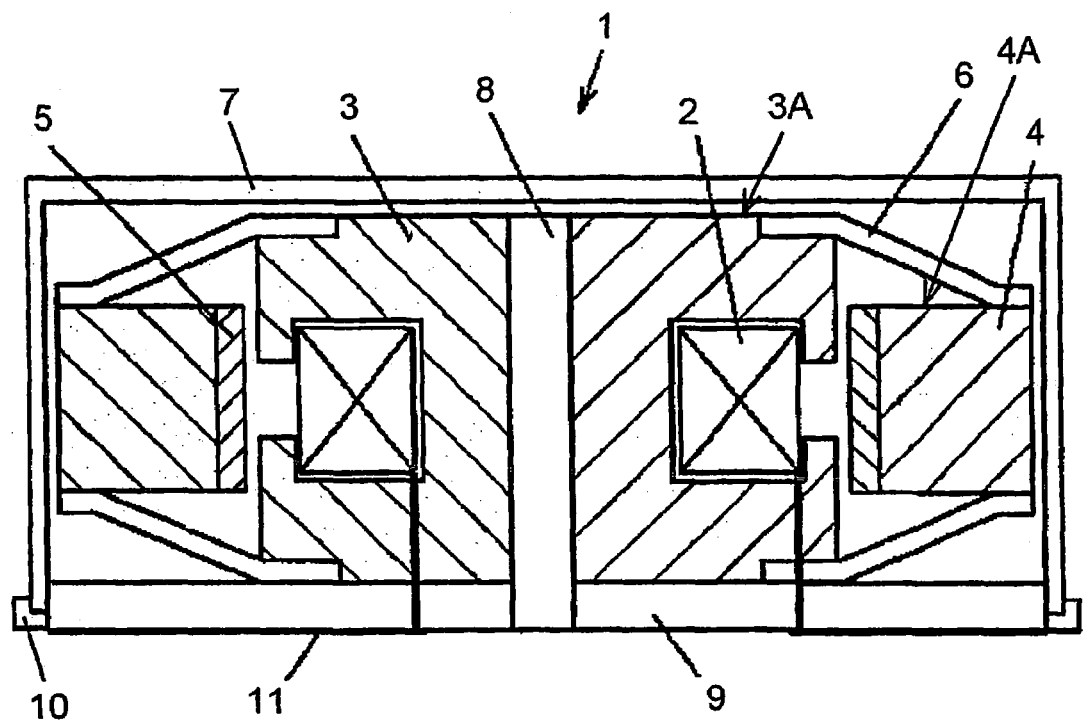
FIG. 1 shows a sectional view of a vibrating linear actuator in accordance with a first exemplary embodiment of the present invention.

FIG. 1 shows a structure of vibrating linear actuator 1, which comprises the following elements:
mover 4A including;
  polygonal outer yoke 4; and
  permanent magnet 5 disposed inside outer yoke 4,
stator 3A disposed inside mover 4A and including:
  tubular inner yoke 3 having teeth at its upper and lower sections with a space between the upper and lower teeth; and
  coil 2 wound on inner yoke 3.

Permanent magnet 5 is magnetized, e.g., N pole at its inner wall and S pole at its outer wall, i.e., the inner wall and the outer wall are magnetized unipolar respectively and different poles from each other. Inner yoke 3 and outer yoke 4 are formed of metallic material made from green compact of magnetic powder, however; they can be formed of thin steel plates laminated radially (thin steel plates are laminated on shaft 8 radially).

Besides, inner yoke 3 and outer yoke 4 can be formed by drawing steel plates, cylindrical steels, ring shaped steels and the like. Furthermore, inner yoke 3 and outer yoke 4 can be made of resin containing metal powders. As discussed above, various materials or producing methods of inner yoke 3 and outer yoke 4 can be considered, and this invention is not limited to the materials and the methods mentioned above.

Inner yoke 3 has shaft 8 at its center, and shaft 8 protrudes from a bottom plate of inner yoke 3. Inner yoke 3 is positioned with the protruding portion of shaft 8 and a recess of base 9, and rigidly mounted on base 9. A lower elastic body 6 is sandwiched by base 9 and inner yoke 3. Base 9 is made from heat-resistant resin of which glass transition temperature is not less than 90° C.

Elastic body 6 is formed of two thin leaf springs (an upper spring and a lower spring) shaped like rings. When mover 4A moves downward from a balanced point, elastic body 6 moves mover 4A upward. When mover 4A moves upward from the balanced position, elastic body 6 moves mover 4A downward. In other words, elastic body 6 energizes mover 4A to be positioned at substantially the midpoint of stator 3A.

Coil 2 is electrically coupled to metallic land 11 extending from the bottom of base 9, and powered from land 11. Land 11 can be prepared on a top face of cover 7 instead of the bottom of base 9.

Cover 7 covers stator 3A and mover 4A, and is caulked to base 9 with cover-caulking section 10 prepared to base 9. Cover 7 protects the components inside of the actuator from touching other components outside the actuator or from damages when the actuator undergoes reflow-soldering.

Cover 7 also helps handling of the actuator. Cover 7 is made from metal; however, it can be made from heat-resistant resin.

Actuator 1 discussed above flows the current supplied from land 11 to coil 2, thereby generating vibrating magnetic flux. Mover 4A vibrates following this vibrating magnetic flux.

Figure 2:
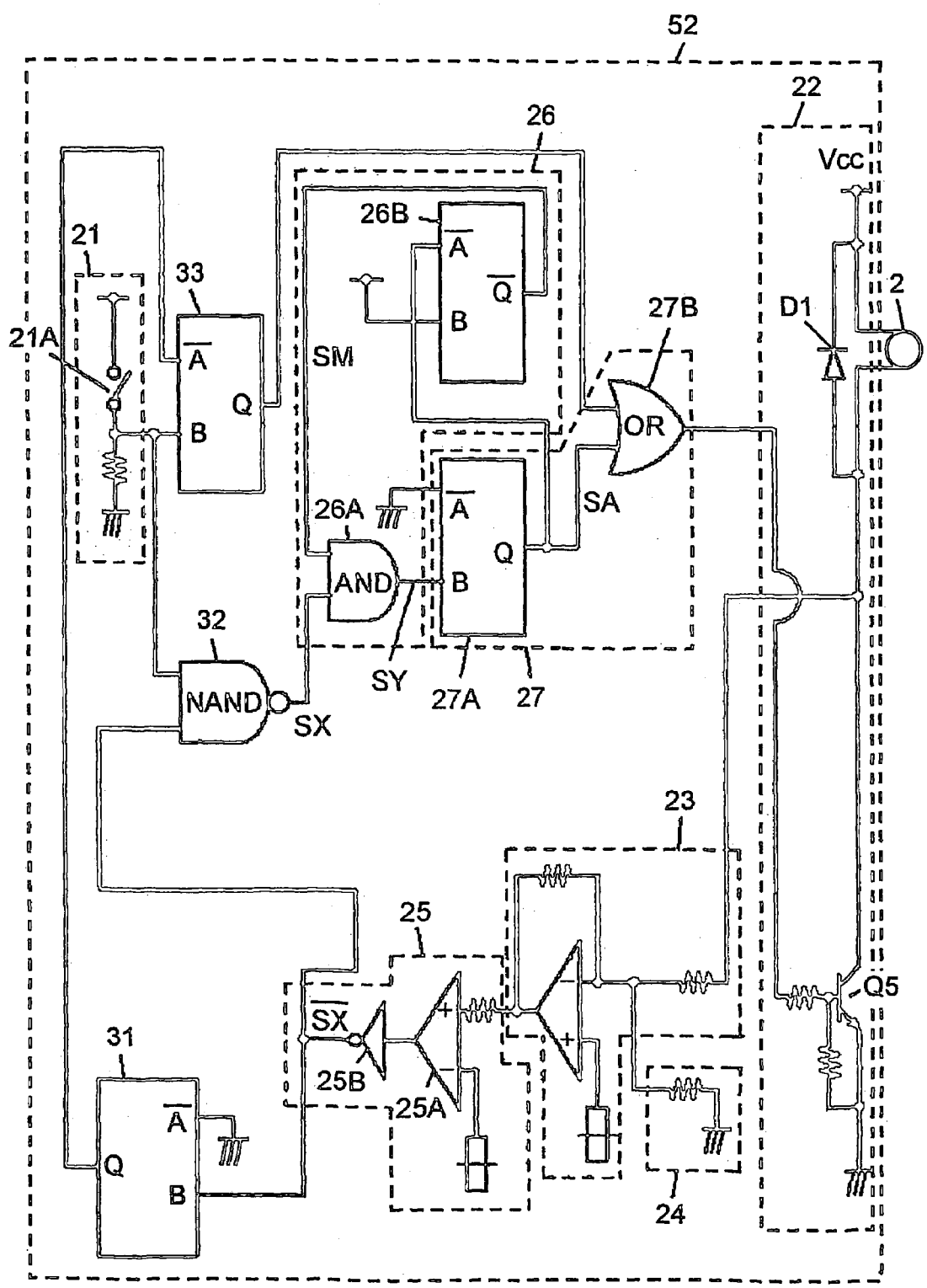
FIG. 2 is a circuit diagram of a driver in accordance with the first exemplary embodiment of the present invention.

FIG. 2 shows a basic structure of a driver that drives this vibrating linear actuator. In FIG. 2, starter 21 is shown schematically as switch 21A, and it starts the actuator like an arrival signal in a portable information apparatus.

Driving section 22 is formed of the following elements: a first end of coil 2 is coupled to a positive electrode of circuit power-source Vcc and a second end thereof is coupled to a collector terminal of switching-element Q5, which is formed of NPN transistor and drives coil 2. An emitter terminal of switching element Q5 is coupled to the negative electrode (grounding potential) of the circuit power source Vcc. The second end of coil 2 is coupled to zero-cross detector 25 via level-shift section 24 and back electromotive force (BEMF) amplifier 23, thereby detecting a zero-cross point of the BEMF. In other words, the zero-cross point of the BEMF is to detect a point where the amplitude of actuator 1 becomes maximum. The signal that detects the maximum amplitude point is fed back to output controller 27, so that driving section 22 works positively in a stable manner.

An operation of the circuit shown in FIG. 2 is detailed hereinafter. Switch 21A of starter 21 is turned on, then signal H is fed into input terminal B of one-shot multi-vibrator 33. On the other hand, input terminal $\overline{A}$ is in status L at the initial stage, so that its output terminal Q outputs pulses of level H having a set time-span. This pulse of level H runs through OR circuit 27B and turns on switching element Q5, and arrives at coil 2 to power it. One-shot multi-vibrator 33 has another input terminal (not shown) to be used for a time-constant, and a capacitor and a resistor are coupled to this input terminal, thereby setting the time span.

Coil 2 is powered and the actuator is started, then BEMF is generated from coil 2 and fed into zero-cross detector 25 via level-shift section 24 and BEMF amplifier 23. Level-shift section 24 adjusts a signal level of BEMF waveform in response to power-source voltage Vcc, and benefits the circuit power-source Vcc to be unified. It can set the reference voltage of BEMF amplifier 23 at any value, e.g., a half of Vcc to comply with the circuit power-source Vcc.

Zero-cross detector 25 compares an input from amplifier 23 with a zero-cross voltage, and inverts the input with inverter element 25B, then outputs signal $\overline{SX}$.

This signal $\overline{SX}$ and a signal of level H of switch 21A are respectively fed into a first input terminal and a second input terminal of NAND element 32, which then outputs signal SX. This signal SX is fed into an input terminal of AND element 26A of zero-cross detecting monitor 26. Another input terminal of AND element is in a status of level H at the initial stage, thus AND element 26A outputs signal SY on the same logic level as signal SX.

One-shot multi-vibrator 27A of output controller 27 receives signal SY at its input terminal B, and turns to level H, then its output terminal Q outputs pulse SA having the set time-span. One-shot multi-vibrator 27A has another input terminal (not shown) to be used for a time-constant, and a capacitor and a resistor are coupled to the input terminal, thereby setting the time span. The pulse of level H turns on switching element Q5 via OR element 27B, and at the same time, this pulse is fed into input terminal $\overline{A}$ of multi-vibrator 26B. Another input terminal B of vibrator 26B is fixed at level H, thus pulse SM of level L having the set time-span is tapped off from output terminal $\overline{Q}$ at the falling edge (level H→level L) of the input signal fed into input terminal $\overline{A}$. One-shot multi-vibrator 26B has another input terminal (not shown) to be used for a time-constant, and a capacitor and a resistor are coupled to the input terminal, thereby setting the time span. An output of level L from multi-vibrator 26B is fed into AND element 26A, and signal SY is forcibly fixed at level L. In other words, the pulse of level L masks a read-error of a zero-cross pulse. (More details will be described later.)

When zero-cross detector 25 does not output signal $\overline{SX}$ clue to, e.g., a halt of the vibrating linear actuator, an output signal from terminal Q of one-shot multi-vibrator 31 turns to level L in the set time-span from the rising of the signal. This falling signal (level H→level L) is fed as a trigger signal into input terminal $\bar{A}$ of one-shot multi-vibrator 33, which then outputs pulse H having the time-span set by vibrator 33, so that the actuator restarts.

When switch 21A of starter 21 is turned off, the second input terminal of NAND element 32 turns to level L, so that the actuator halts.

Diode D1 of driving section 22 protects switching element Q5 when the BEMF of coil 2 becomes extraordinarily high.

An NPN transistor is used in switching element Q5 of driving section 22; however, a PNP transistor can be used instead. In this case, the emitter of the PNP transistor is coupled to the positive electrode of power-source Vcc, and the collector is coupled to a first end of the coil, and a second end of the coil is coupled to the negative electrode (grounding potential) of power-source Vcc. This structure allows the first end of the coil to detect the zero-cross point of the BEMF.

Figure 3:
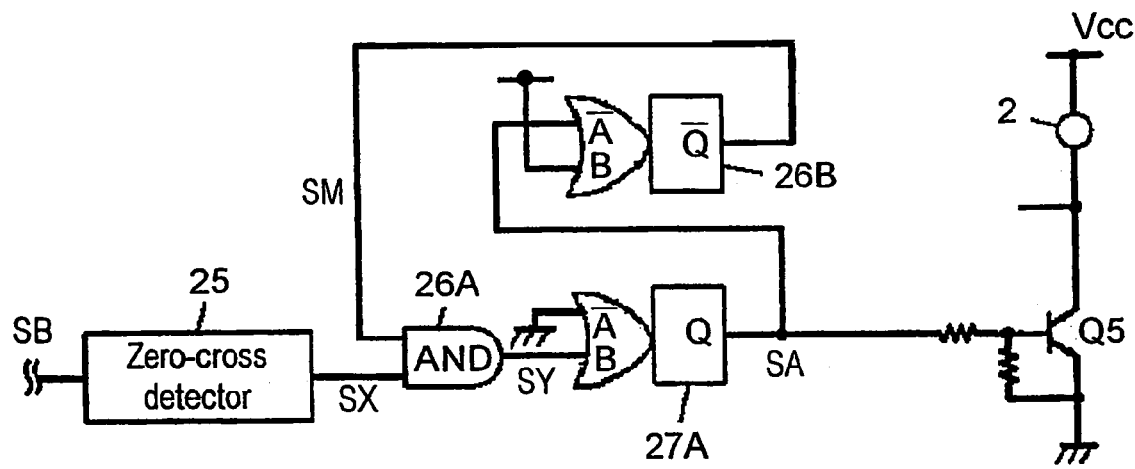
FIG. 3 is a circuit diagram of a function for monitoring a zero-cross detecting signal in accordance with the first exemplary embodiment of the present invention.
Figure 4:
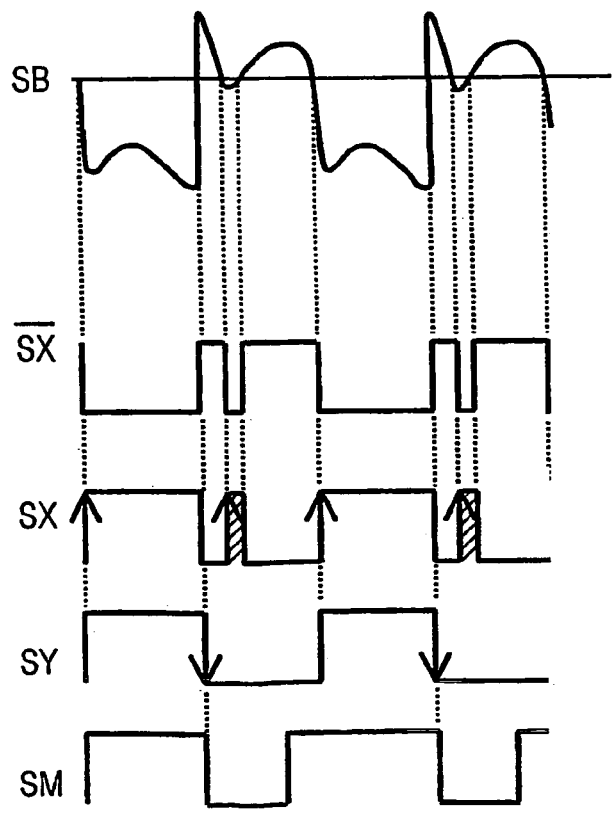
FIG. 4 is a timing chart illustrating the monitoring function.

A function (masking function) of monitoring a zero-cross detecting signal is detailed with reference to FIG. 3 and FIG. 4. FIG. 3 shows the section of the monitoring function selected from FIG. 2. Reference marks SB, SX, SM, SY, and SA represent signals of respective elements, and correspond to the waveforms in FIG. 4 marked with the same reference marks.

Waveform SB of the BEMF produced by coil 2 is shaped by zero-cross detector 25, and is tapped off as waveform $\overline{SX}$. Then it is inverted by NAND element 32 (not shown), so that waveform SX is output; however this wave-form includes error signals marked with shading in FIG. 4. Waveform SM is a mask signal generated by one-shot multi-vibrator 26B, and fed back to AND element 26A, thereby removing the error signals. As a result, correct zero-cross signal SY is obtained. This signal SY is output as signal SA by one-shot multi-vibrator 27A, and then fed into switching element Q5. Signal SA is omitted in FIG. 4, however, signal SA becomes the same as signal SY.

Figure 5:
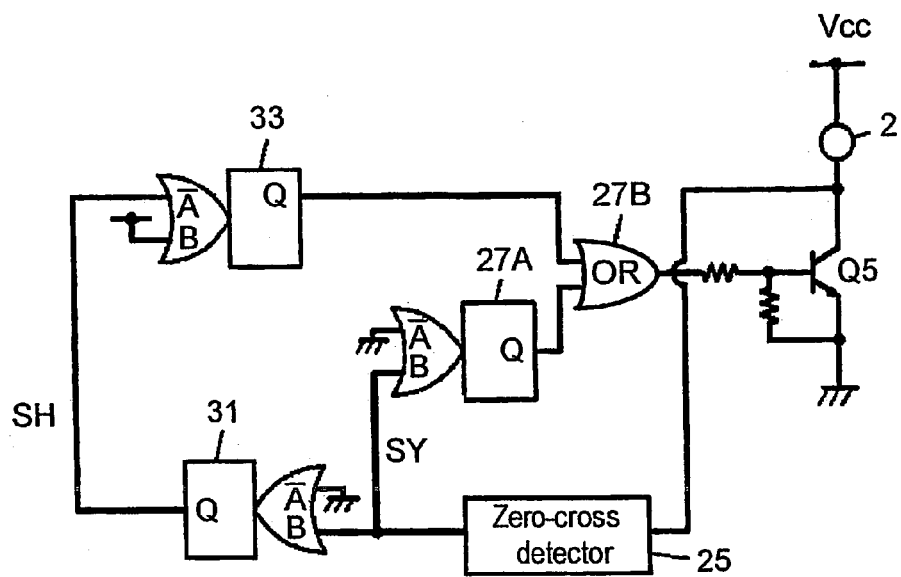
FIG. 5 is a circuit diagram of a function for re-starting the zero-cross in accordance with the first exemplary embodiment of the present invention.
Figure 6A:
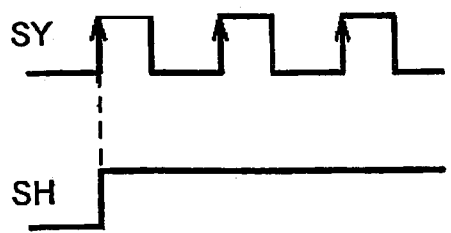
FIG. 6A and FIG. 6B show timing charts illustrating the re-starting function.
Figure 6B:
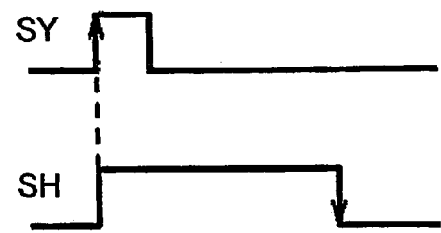

Next, the restarting function is detailed with reference to FIGS. 5, 6A and 6B. FIG. 5 shows the section of restarting function selected from FIG. 2. FIGS. 6A and 6B show timing charts of zero-cross detecting signal SY and hold-signal SH. FIG. 6A shows a case where zero-cross signals are sequentially detected, and FIG. 6B shows a case where a zero-cross signal is failed to be detected. As shown in FIG. 6B, a failure of detecting the zero-cross signal changes hold-signal SH to level L in a given time, so that multi-vibrator 33 produces a re-starting pulse thereby restarting the actuator.

Figure 7:
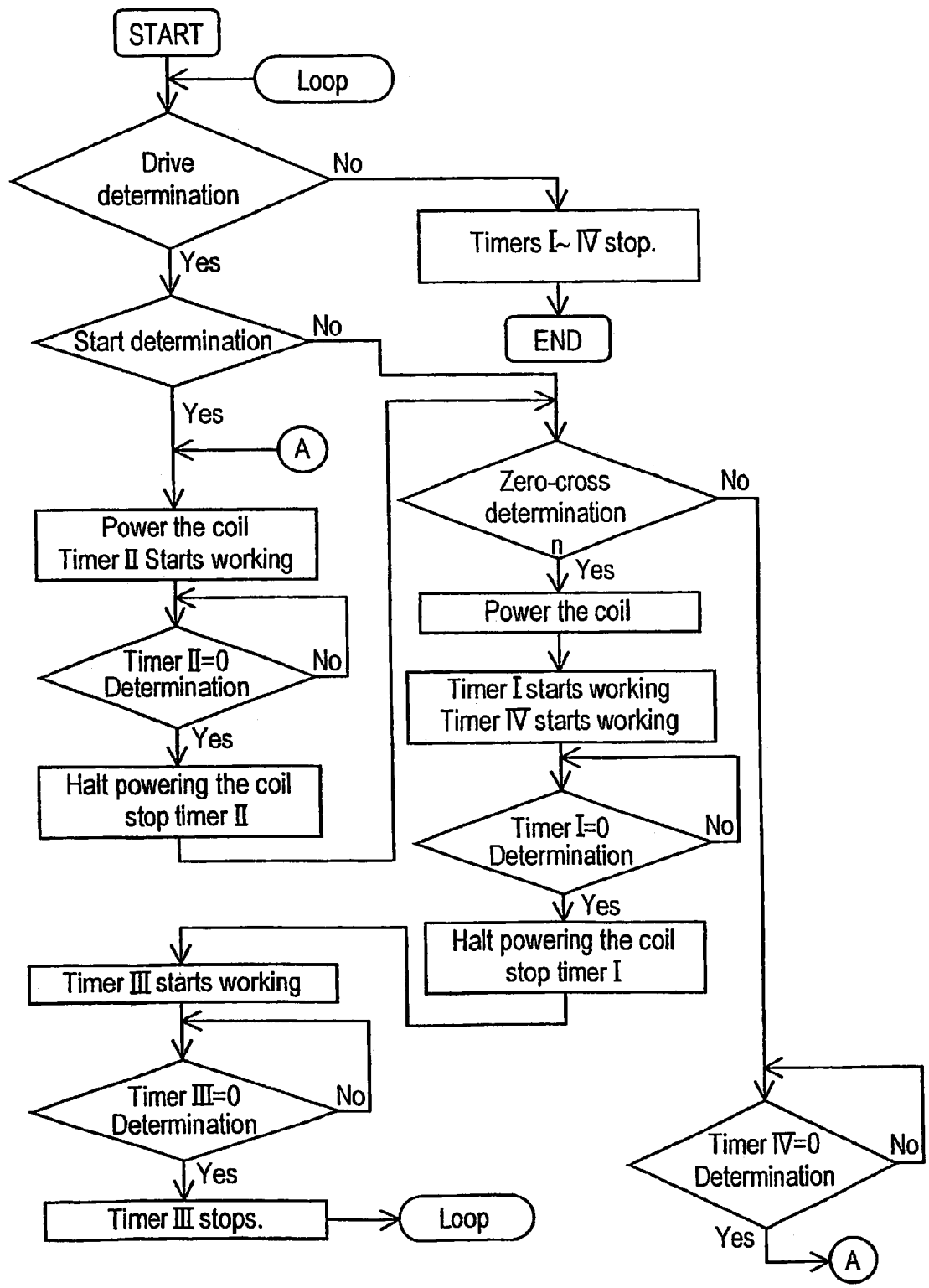
FIG. 7 is a flowchart of processing a signal by the driver.

FIG. 7 shows a flowchart illustrating the processing of signals in the actuating device in accordance with the first embodiment. Timer I, II, III, and IV are timing setters and correspond to one-shot multi-vibrators 27A, 33, 26B, and 31 shown in FIG. 2 respectively. The flow of FIG. 7 illustrates software-wise the process in the actuating device.

Respective timers operate as follows: Timer I determines a width of work pulse, so that it determines a period of powering coil 2 in respective cycles. Timer I starts counting at decision Yes of BEMF zero-cross and halts the powering at count-up.

Timer II determines a width of a starter pulse, so that it determines a period of powering coil 2 at starting. Timer II starts counting with a starter signal and halts the powering at count-up.

Timer III determines a width of a mask pulse, and starts counting when timer I counts up. Timer III keeps masking the zero-cross determinations until it counts up.

Timer IV determines a width of a hold pulse, and starts counting at decision Yes of zero-cross, and the operation returns to timer II when it counts up.

Next, the flowchart shown in FIG. 7 is detailed. First, switch 21A of starter 21 is turned on, then when drive determination and start determination are Yes, timer II starts working for outputting an actuator starter pulse. The starter pulse of which width is the time-span of timer II is supplied to power coil 2, and the actuator forcibly starts driving. When timer II counts up, the supply of the starter pulses is turned off, so that the powering to the coil is halted. Then the BEMF of coil 2 is monitored, and when zero-cross determination is Yes, the powering to coil 2 starts again, and both of timer I and timer IV start counting. When timer I counts up, the powering to coil 2 is halted, and at the same time timer III starts counting. When timer III counts up, this loop is fed back to the start signal. If zero-cross determination is Yes again before timer IV counts up, the count of timer IV is reset. However, if timer IV counts up with its count being left non-reset, this loop is fed back to a starter determining section. In other words, when the actuator is halted due to failure in determining a zero-cross, coil 2 is powered for restarting the actuator. If no starter signal is available, the output controller is turned off and all the timers I-IV are halted.

Figure 8:
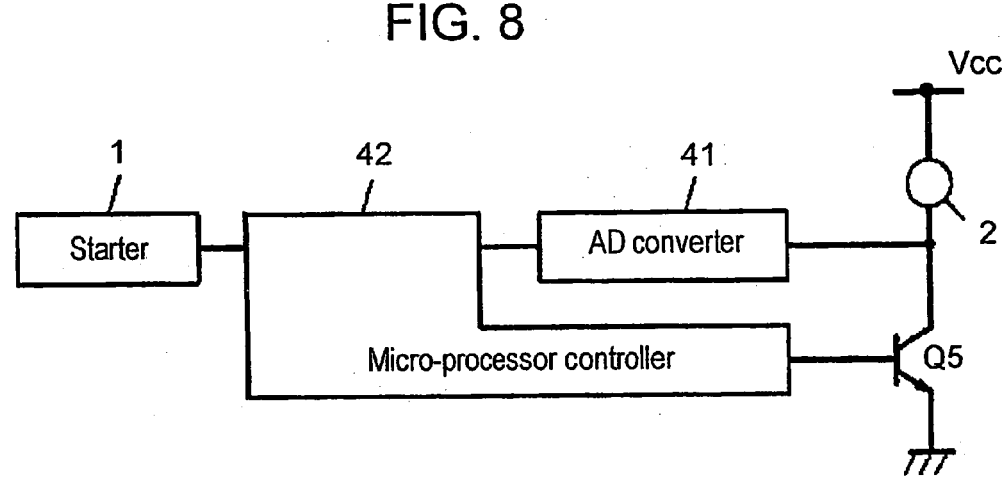
FIG. 8 shows a hardware structure of the driver.

The foregoing process can be carried out with ease using the flowchart shown in FIG. 7 by software built in a micro-processor. The hardware construction in such a case is shown in FIG. 8. The BEMF is fed into micro-processor controller 42 via analog-digital converter 41, thereby detecting the zero-cross of the BEMF produced by coil 2 of the actuator, and at the same time the switching element is driven at an optimum timing. If the BEMF undergone the A-D conversion is fed into the micro-processor, any timing other than the zero-cross of BEMF can be detected, so that the timing of the driving pulse can be controlled at any position of mover 4A. For instance, the maximum amplitude (either positive or negative) of the BEMF is detected, and the driving pulse of the actuator is output. An experiment proves that the driving pulse is supplied most efficiently at this timing.

Figure 9:
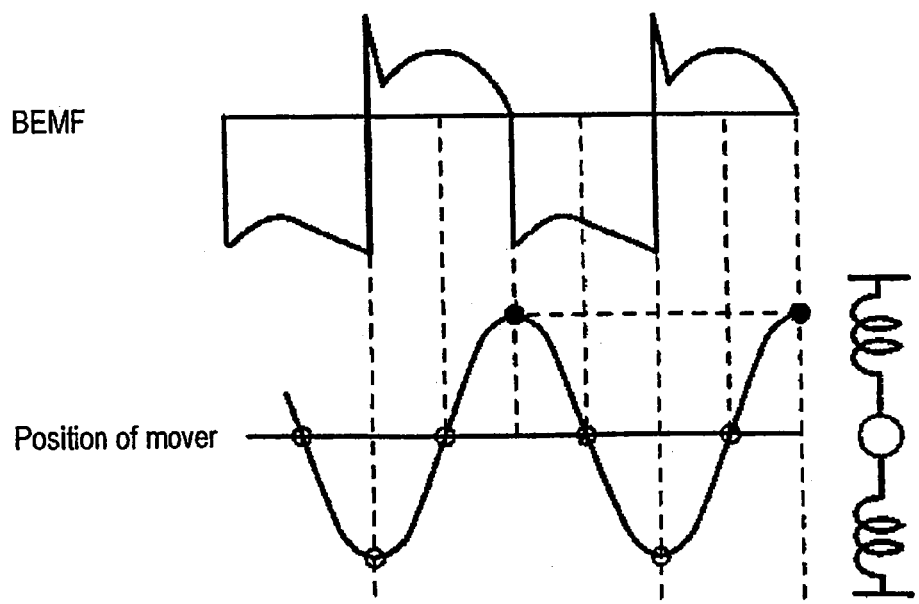
FIG. 9 is a timing chart illustrating the signal processing.

FIG. 9 shows a timing chart illustrating a positional relation between the BEMF waveform and mover 4A. The zero-cross point of BEMF corresponds to the largest displacement point of mover 4A. The zero-cross point of BEMF waveform appears at the point where ¼ cycle is delayed from the zero-cross point of mover 4A. At either one of those timings, the switching element can be driven. However, switching element Q5 is turned on during a period including the zero-cross point of mover 4A, and kinetic energy is given to mover 4A when mover 4A moves at its maximum speed. Then the switching element can be driven most efficiently.

As discussed above, the present invention includes a function of detecting a zero-cross point of BEMF of coil 2, and the powering of the coil in only one-way can excites mover 4A. In other words, mover 4A can be moved in a positive direction by electromagnetic force obtained by powering coil 2, and it can be moved in a negative direction by repulsion or attraction of elastic body 6, so that less power consumption can be achieved.

The BEMF generated from an end of coil 2 is directly used to detect a zero-cross point of the BEMF, so that additional components for the detection are not needed, and a simple structure can be achieved.

Exemplary Embodiment 2

Figure 10:
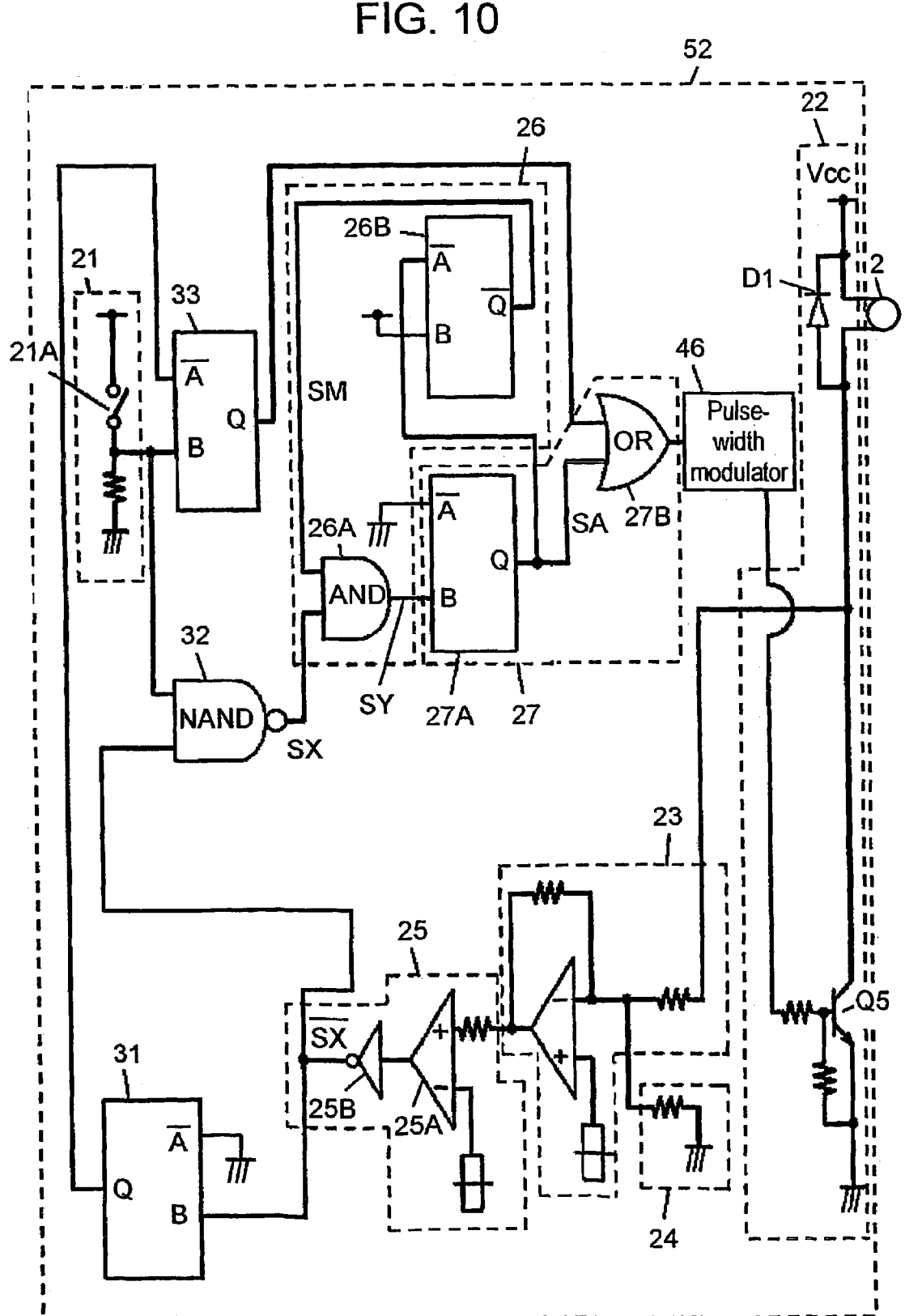
FIG. 10 is a circuit diagram of a driver in accordance with a second exemplary embodiment of the present invention.

FIG. 10 shows a circuit structure of a vibration linear actuating device in accordance with the second exemplary embodiment of the present invention. The device used in the second embodiment includes pulse-width modulator 46 in addition to the circuit shown in FIG. 2, so that a smaller coil resistance is expected, which is particularly effective when an over current flows in turning on switching element Q5. Modulator 46 modulates a pulse width of a signal supplied from the output controller as an input signal to the switching element, so that the actuator can be driven in a stable manner and yet the power consumption can be lowered.

Exemplary Embodiment 3

Figure 11:
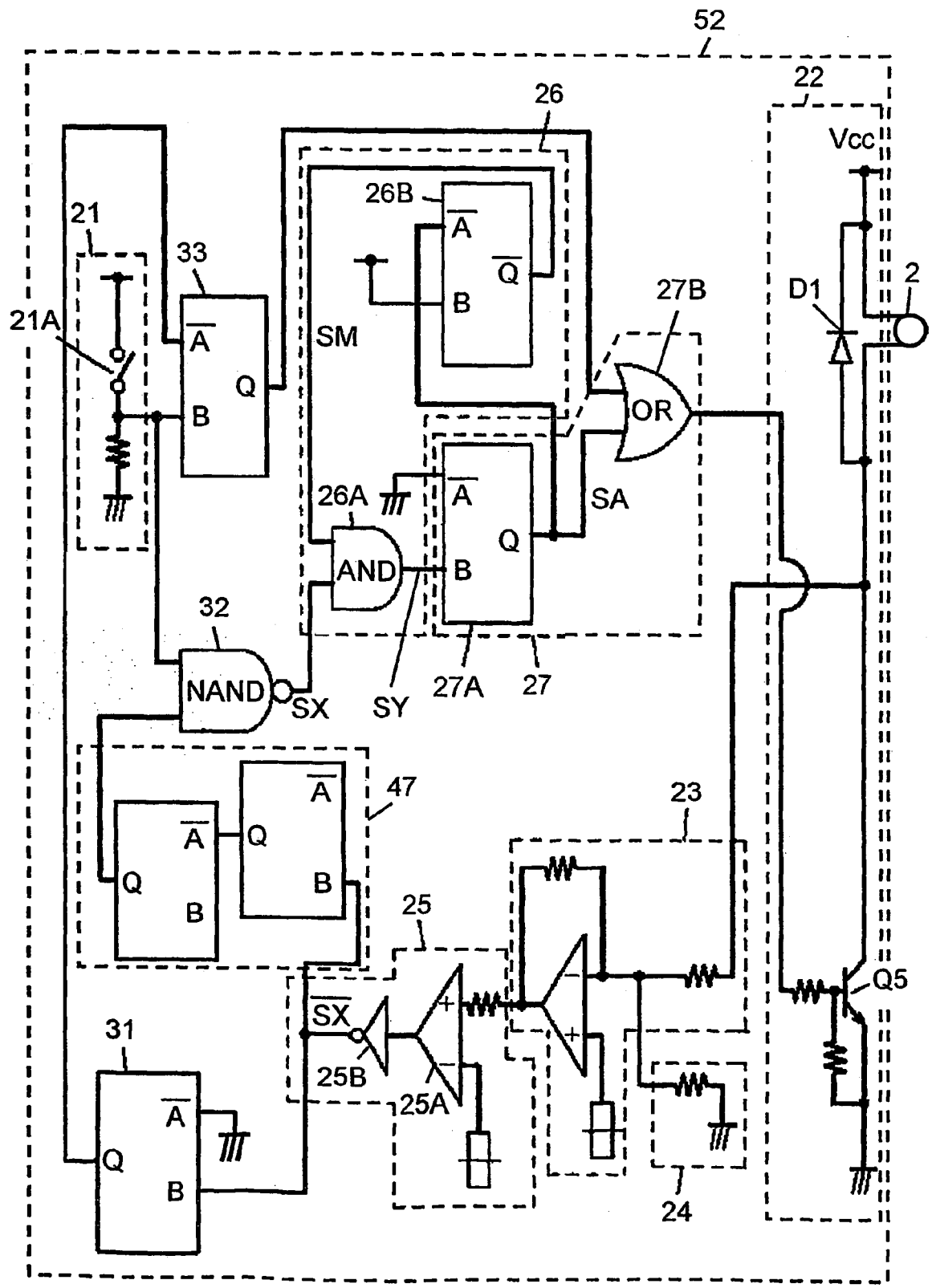
FIG. 11 is a circuit diagram of a driver in accordance with a third exemplary embodiment of the present invention.
Figure 12:
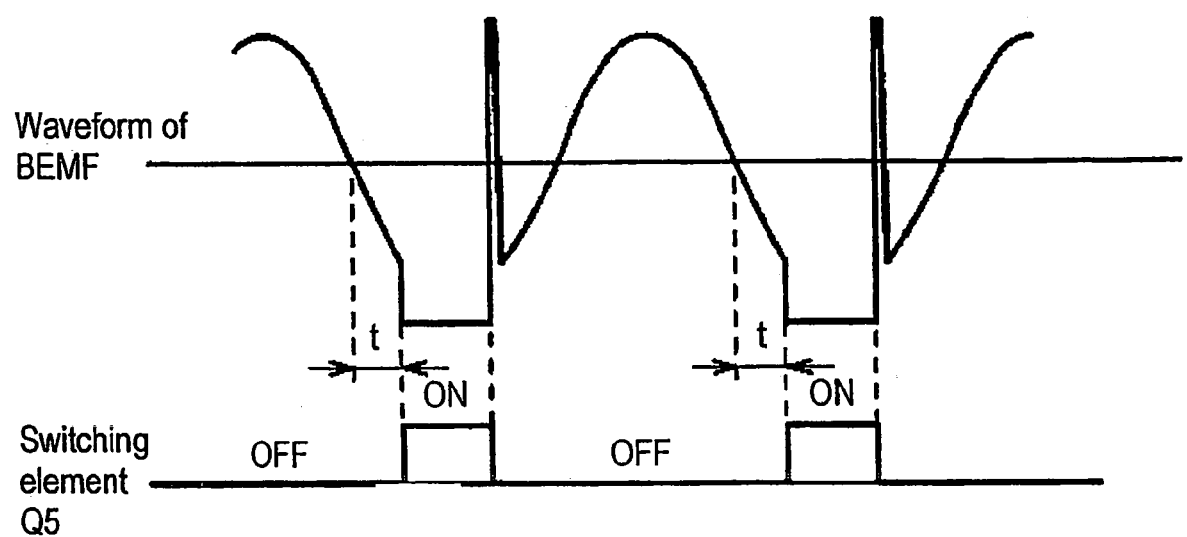
FIG. 12 shows a timing chart illustrating an operation of the driver in accordance with the third exemplary embodiment of the present invention.

FIG. 11 shows a circuit structure of a vibration linear actuating device in accordance with the third exemplary embodiment of the present invention. The device used in the third embodiment includes timing adjuster 47, formed of two-stage flip-flop circuit, in addition to the circuit shown in FIG. 2. As shown in a timing chart of FIG. 12, switching element Q5 is turned on with a delay of time "t" from a zero-cross point of BEMF, thereby outputting an actuator-driving pulse at any timing delayed from a zero-cross point of BEMF. As a result, the actuator can be driven at a position close to the zero-cross point of mover 4A, because this point is experimentally proved efficient.

Exemplary Embodiment 4

Figure 13:
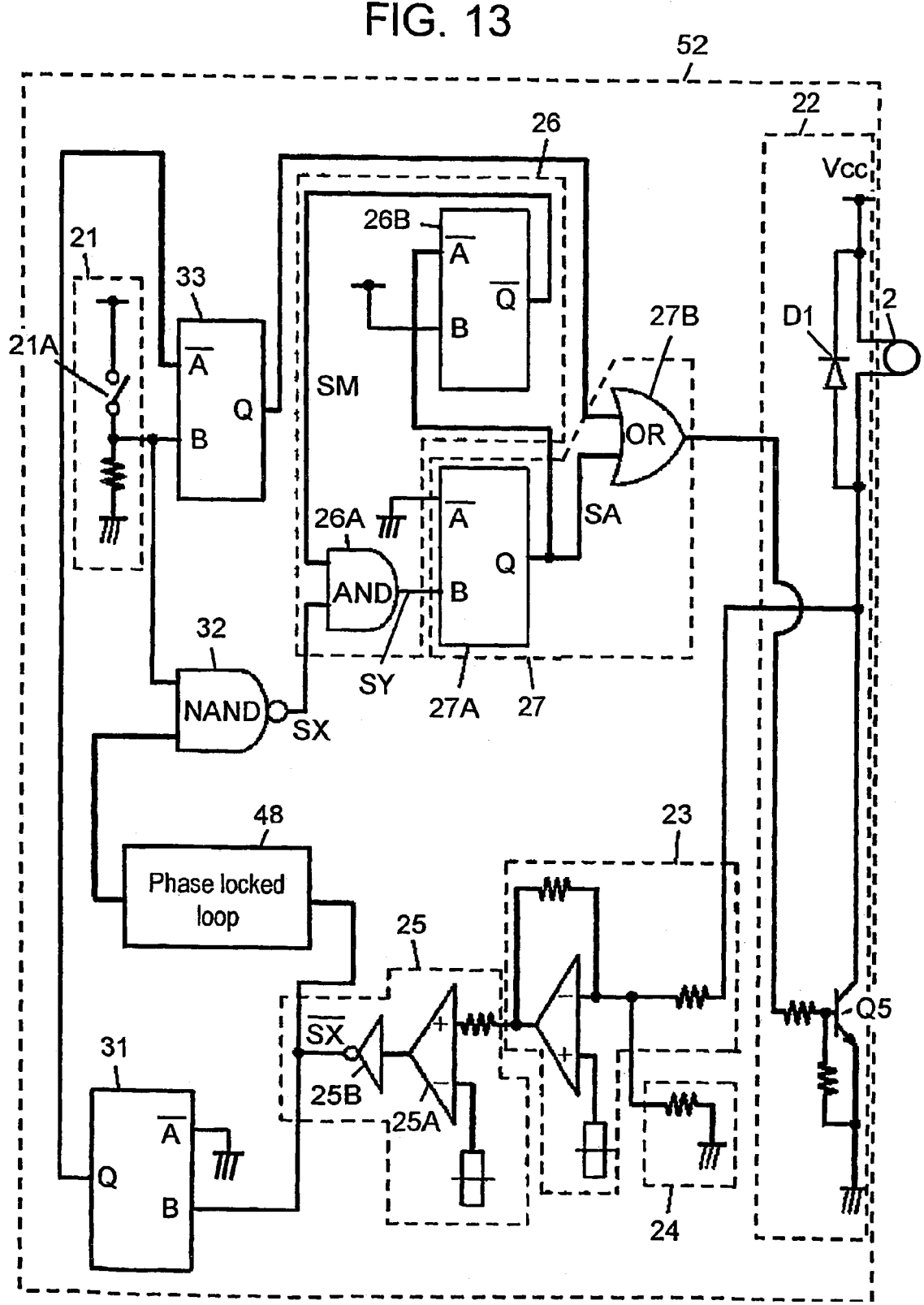
FIG. 13 is a circuit diagram of a driver in accordance with a fourth exemplary embodiment of the present invention.

FIG. 13 shows a circuit structure of a vibration linear actuating device in accordance with the fourth exemplary embodiment of the present invention. The device used in the fourth embodiment includes phase locked loop (PLL) 48 as a timing adjuster in addition to the circuit shown in FIG. 2. This structure allows generating a signal for driving the switching element Q5 at any tiling with respect to the vibrations of mover 4A even if a resonance point of actuator 1 varies with reference to a zero-cross detecting signal.

Exemplary Embodiment 5

Figure 14:
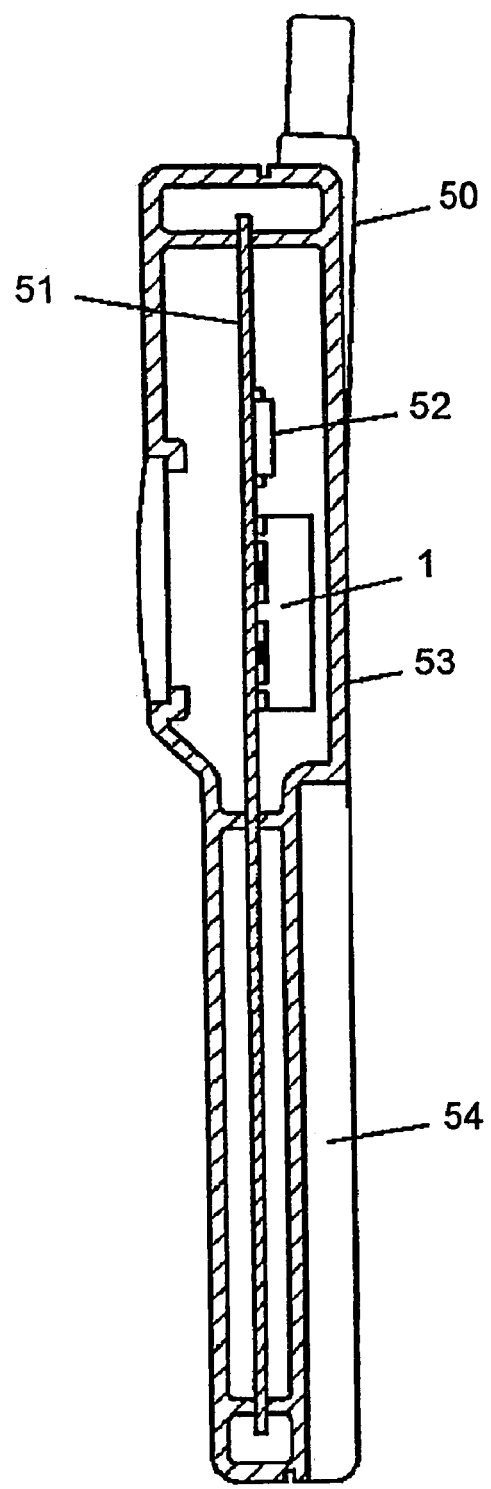
FIG. 14 shows a sectional view illustrating a structure of a portable information apparatus in accordance with a fifth exemplary embodiment of the present invention.
Figure 15:
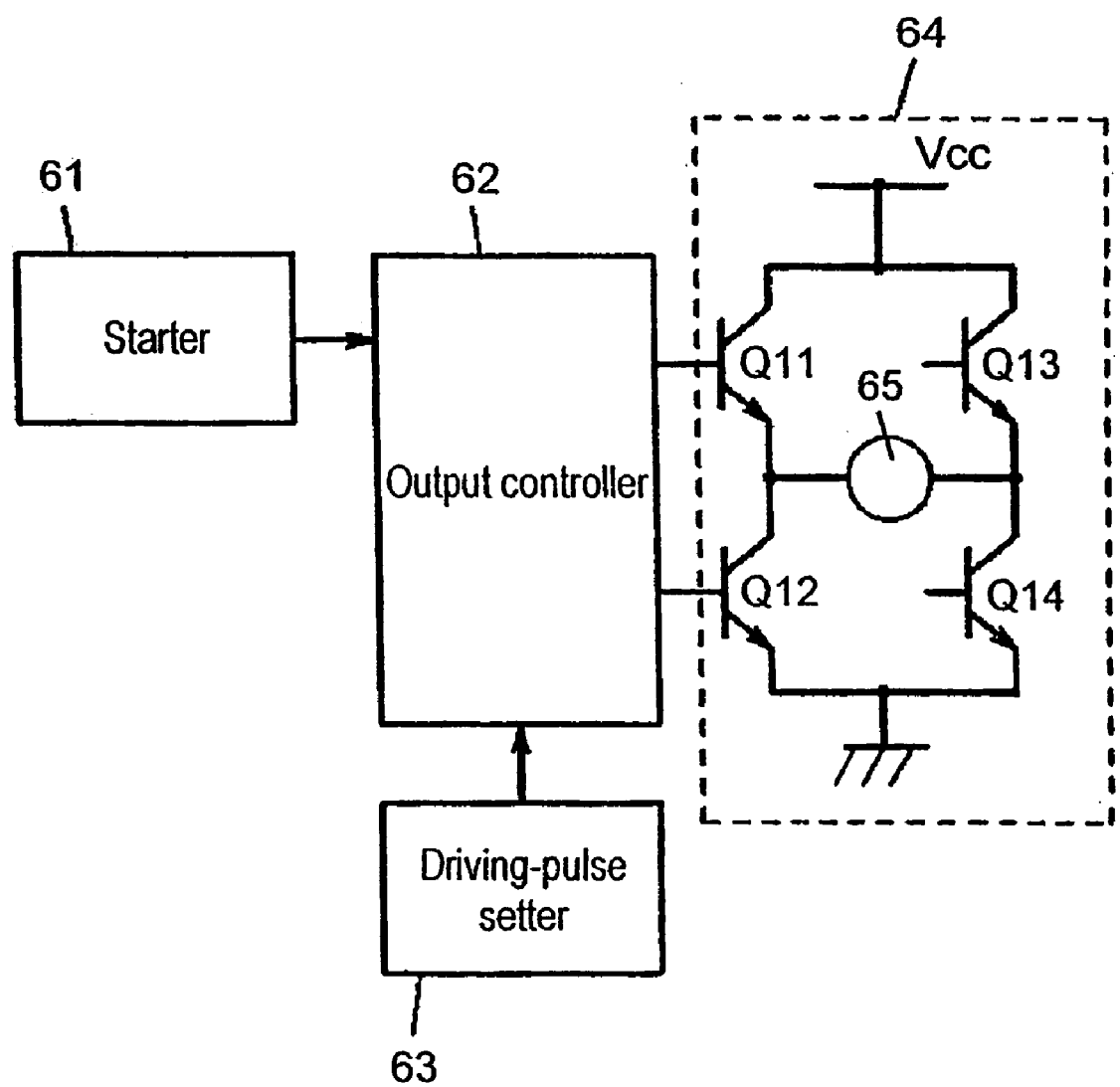
FIG. 15 shows a circuit structure of prior art.

A portable information apparatus, e.g., cellular phone, equipped with the vibrating linear actuator of the present invention, in accordance with the fifth exemplary embodiment of the present invention is demonstrated hereinafter. FIG. 14 shows a sectional view illustrating the structure of the apparatus. Actuator 1 shown in FIG. 1 is directly mounted on apparatus board 51 with its shaft (shaft 8 shown in FIG. 1) kept standing vertically.

The terminal land (land 11 shown in FIG. 1) provided beneath actuator 1 is directly brazed to the land provided to the upper face of board 51. Driver 52 of actuator 1 is mounted on board 51 together with circuit-components of the apparatus. Housing 53 of apparatus 50 houses battery 54 therein, and battery 54 powers the apparatus circuit and driver 52. When a coil of an inner yoke of the actuator is powered, its magnetic field attracts or repels an outer yoke, and when the powering to the coil is halted, the outer yoke reacts to a leaf spring (elastic body). As a result, actuator 1 vibrates such that an amplitude of the vibration becomes maximum in a direction vertical to a surface of board 51. In the case of a cellular phone, it adopts an arrival signal as a starter signal for actuator 1, thereby operating actuator 1, and the vibrations of actuator 1 can be sensed by a user as an arrival signal vibrating in a maximum amplitude.

INDUSTRIAL APPLICABILITY

Powering a coil of an actuator can be controlled by on-off of a single switching element. A zero-cross of BEMF of the coil is detected, and the detection signal is fed back to an output controller, so that a circuit of a driver is simplified. As a result, the driver operates positively in a stable manner, and can work with less power consumption.

A major system of drive-control of the actuator can be controlled with ease by a micro-processor, so that a vibration linear actuating device can be further downsized.

A slimmed down and highly efficient vibration linear actuating device and a portable information apparatus equipped with this device can be provided. Therefore, portability of the apparatus and durability of batteries can be improved.

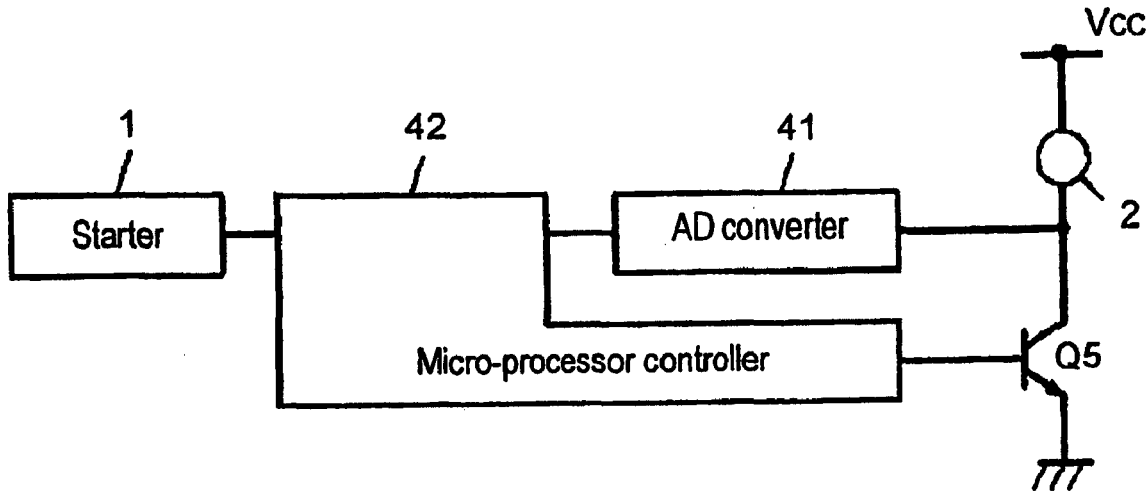

The invention claimed is:

1. A vibration linear actuating device comprising a vibrating linear actuator and a driver for driving the actuator;
    the vibrating linear actuator including:
        (a) a mover having a permanent magnet magnetized in a radial direction;
        (b) a stator having a coil and facing the permanent magnet; and
        (c) an elastic body for coupling the stator to the mover and energizing the mover toward a center of the stator,
    the driver including:
        (d) a driving section having a switching element for powering the coil;
        (e) an output controller for controlling the switching element; and
        (f) a zero-cross detector for detecting a zero-cross point of back electromotive force (BEMF) generated in the coil and outputting a zero-cross signal,
    wherein the driver transmits the zero-cross signal to the output controller and powers the coil in one direction for vibrating the mover in corporation with the elastic body.

2. The vibration linear actuating device of claim 1, wherein the driver further includes a zero-cross monitor disposed between the zero-cross detector and the output controller.

3. The vibration linear actuating device of claim 2, wherein the zero-cross monitor monitors the zero-cross signal and does not permit receiving a next zero-cross signal for a given time after the monitor receives the zero-cross signal.

4. The vibration linear actuating device of claim 1, wherein the driver transmits a re-starter signal to the output controller when the zero-cross signal is halted for a given time.

5. The vibration linear actuating device of claim 1, wherein the zero-cross detector is coupled to the coil via a BEMF amplifier and a level-shift section.

6. The vibration linear actuating device of claim 1, wherein the driver further includes a timing adjuster disposed between the zero-cross detector and the output controller.

7. The vibration linear actuating device of claim 6, wherein the timing adjuster includes a phase locked loop.

8. The vibration linear actuating device of claim 1, wherein the output controller includes a pulse width modulator.

9. A method of driving an vibrating linear actuator, the actuator comprising:
a mover having a permanent magnet magnetized in a radial direction;
a stator having a coil and facing the permanent magnet; and
an elastic body for coupling the stator to the mover and energizing the mover toward a center of the stator,
the method comprising the steps of:
(a) determining a zero-cross point of back electromotive force generated in the coil;
(b) determining a period for powering the coil in every cycle;
(c) determining a period for powering the coil at starting time; and
(d) counting step (b) based on the determined result of step (a).

10. The method of driving an vibrating linear actuator of claim 9 further comprising step (e) for counting for itself based on the determined result of step (a), wherein the determined result of step (a) is kept invalid until step (e) counts up.

11. The method of driving an vibrating linear actuator of claim 9 further comprising step (f) for counting for itself based on the determined result of step (a), wherein step (c) starts counting when step (f) counts up.

12. The method of driving a vibrating linear actuator of claim 11, wherein step (f) is reset depending on a next determined result.

13. A portable information apparatus comprising:
(a) a board;
(b) a vibrating linear actuator mounted to the board; the actuator including:
(b-1) a mover having a permanent magnet magnetized in a radial direction;
(b-2) a stator having a coil and facing the permanent magnet; and
(b-3) an elastic body for coupling the stator to the mover and energizing the mover toward a center of the stator,
(c) a driver mounted to the board, the driver including:
(c-1) a driving section having a switching element for powering the coil;
(c-2) an output controller for controlling the switching element; and
(c-3) a zero-cross detector for detecting a zero-cross point of back electromotive force (BEMF) generated in the coil and outputting a zero-cross signal,
wherein the driver transmits the zero-cross signal to the output controller and powers the coil in one direction for vibrating the mover in corporation with the elastic body.

14. The portable information apparatus of claim 13, wherein the vibrating linear actuator generates vibrations with a maximum amplitude in a vertical direction to the board.

15. The portable information apparatus of claim 13, wherein the driver further includes a zero-cross monitor disposed between the zero-cross detector and the output controller.

16. The portable information apparatus of claim 15, wherein the zero-cross monitor monitors the zero-cross signal and does not permit receiving a next zero-cross signal for a given time after the monitor receives the zero-cross signal.

17. The portable information apparatus of claim 13, wherein the driver transmits a re-starter signal to the output controller when the zero-cross signal is halted for a given time.

18. The portable information apparatus of claim 13, wherein the zero-cross detector is coupled to the coil via a BEMF amplifier and a level-shift section.

19. The portable information apparatus of claim 13, wherein the driver further includes a timing adjuster disposed between the zero-cross detector and the output controller.

20. The portable information apparatus of claim 19, wherein the timing adjuster includes a phase locked loop.

21. The portable information apparatus of claim 13, wherein the output controller includes a pulse width modulator.

* * * * *

UNITED STATES PATENT AND TRADEMARK OFFICE
CERTIFICATE OF CORRECTION

PATENT NO.       : 7,268,503 B2
APPLICATION NO.  : 10/508992
DATED            : September 11, 2007
INVENTOR(S)      : Yamasaki et al.

It is certified that error appears in the above-identified patent and that said Letters Patent is hereby corrected as shown below:

Please replace claim 1 with the following:

1.  A vibration linear actuating device comprising a vibrating linear actuator and a driver for driving the actuator;
the vibrating linear actuator including:
(a)  a mover having a permanent magnet magnetized in a radial direction
(b)  a stator having a coil and facing the permanent magnet; and
(c)  an elastic body for coupling the stator to the mover and energizing the mover toward a center of the stator, the driver including:
(d)  a driving section having a switching element for powering the coil;
(e)  and output controller for controlling the switching element; and
(f)  a zero-cross detector for detecting a zero-cross point of back electromotive force (BEMF) generated in the coil and outputting a zero-cross signal;
wherein the driver transmits the zero-cross signal to the output controller and powers the coil in one direction for vibrating the mover in corporation with the elastic body,
characterized by
(g)  a zero-cross monitor interposed between the zero-cross detector and the output controller, the zero-cross monitor monitoring the zero-cross signal and prohibiting acceptance of a next zero-cross signal for a given time after input of the zero-cross signal.

Please replace claim 2 with the following:

2.  The vibration linear actuating device of claim 1, wherein the driver transmits a re-starter signal to the output controller when the zero-cross signal is halted for a given time.

Please replace claim 3 with the following:

3.  The vibration linear actuating device of claim 1, wherein the zero-cross detector is coupled to the coil via a BEMF amplifier and a level-shift section.

Please replace claim 4 with the following:

4. The vibration linear actuating device of claim 1, wherein the driver further includes a timing adjuster disposed between the zero-cross detector and the output controller.

Please replace claim 5 with the following:

5. The vibration linear actuating device of claim 4, wherein the timing adjuster includes a phase locked loop.

Please replace claim 6 with the following:

6. The vibration linear actuating device of claim 1, wherein the output controller includes a pulse width modulator.

Please replace claim 7 with the following:

7. A method of driving a vibrating linear actuator, the actuator comprising:
    a mover having a permanent magnet magnetized in a radial direction;
    a stator having a coil and facing the permanent magnet; and
    an elastic body for coupling the stator to the mover and energizing the mover toward a center of the stator, the method comprising the steps of:
    (a) determining a zero-cross point of back electromotive force generated in the coil;
    (b) determining a period for powering the coil in every cycle;
    (c) determining a period for powering the coil at starting time;
    (d) counting step (b) based on the determined result of step (a); characterized by the additional step of
    (e) starting to count depending on the judging result at step (a), wherein the judging result at step (a) is kept invalidated until counting up at step (e).

Please replace claim 8 with the following:

8. The method of driving a vibrating linear actuator of claim 7 further comprising step (f) for counting for itself based on the determined result of step (a), wherein step (c) starts counting when step (f) counts up.

Please replace claim 9 with the following:

9. The method of driving a vibrating linear actuator of claim 8, wherein step (f) is reset depending on a next determined result.

Please replace claim 10 with the following:

10. A portable information apparatus comprising:
(a) a board;
(b) a vibrating linear actuator mounted to the board; the actuator including:
(b-1) a mover having a permanent magnet magnetized in a radial direction;
(b-2) a stator having a coil and facing the permanent magnet; and
(b-3) an elastic body for coupling the stator to the mover and energizing the mover toward a center of the stator;
(c) a driver mounted to the board, the driver including:
(c-1) a driving section having a switching element for powering the coil;
(c-2) an output controller for controlling the switching element; and
(c-3) a zero-cross detector for detecting a zero-cross point of back electromotive force (BEMF) generated in the coil and outputting a zero-cross signal;
wherein the driver transmits the zero-cross signal to the output controller and powers the coil in one direction for vibrating the mover in corporation with the elastic body,
characterized by
(c-4) a zero-cross monitor interposed between the zero-cross detector and the output controller,
the zero-cross monitor monitoring the zero-cross signal and prohibiting acceptance of a next zero-cross signal for a given time after input of the zero-cross signal.

Please replace claim 11 with the following:

11. The portable information apparatus of claim 10, wherein the vibrating linear actuator generates vibrations with a maximum amplitude in a vertical direction to the board.

Please replace claim 12 with the following:

12. The portable information apparatus of claim 10, wherein the driver transmits a re-starter signal to the output controller when the zero-cross signal is halted for a given time.

CERTIFICATE OF CORRECTION (continued)
U.S. Pat. No. 7,268,503 B2

Please replace claim 13 with the following:

13. The portable information apparatus of claim 10, wherein the zero-cross detector is coupled to the coil via a BEMF ampler and a level-shift section.

Please replace claim 14 with the following:

14. The portable information apparatus of claim 10, wherein the driver further includes a timing adjuster disposed between the zero-cross detector and the output controller.

Please replace claim 15 with the following:

15. The portable information apparatus of claim 14, wherein the timing adjuster includes a phase locked loop.

Please replace claim 16 with the following:

16. The portable information apparatus of claim 10, wherein the output controller includes a pulse width modulator.

Cancel claims 17-21.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,268,503 B2
APPLICATION NO. : 10/508992
DATED : September 11, 2007
INVENTOR(S) : Yamasaki et al.

It is certified that error appears in the above-identified patent and that said Letters Patent is hereby corrected as shown below:

Delete the title page and substitute therefore the attached title page consisting of corrected number of claims in printed patent.

Column 8, line 20 - Column 10, line 41, delete claims 1-21 and substitute therefore with the following claims 1-16:

1. A vibration linear actuating device comprising a vibrating linear actuator and a driver for driving the actuator;
the vibrating linear actuator including:
(a) a mover having a permanent magnet magnetized in a radial direction
(b) a stator having a coil and facing the permanent magnet; and
(c) an elastic body for coupling the stator to the mover and energizing the mover toward a center of the stator, the driver including:
(d) a driving section having a switching element for powering the coil;
(e) and output controller for controlling the switching element; and
(f) a zero-cross detector for detecting a zero-cross point of back electromotive force (BEMF) generated in the coil and outputting a zero-cross signal;
wherein the driver transmits the zero-cross signal to the output controller and powers the coil in one direction for vibrating the mover in corporation with the elastic body,
characterized by
(g) a zero-cross monitor interposed between the zero-cross detector and the output controller, the zero-cross monitor monitoring the zero-cross signal and prohibiting acceptance of a next zero-cross signal for a given time after input of the zero-cross signal.

2. The vibration linear actuating device of claim 1, wherein the driver transmits a re-starter signal to the output controller when the zero-cross signal is halted for a given time.

3. The vibration linear actuating device of claim 1, wherein the zero-cross detector is coupled to the coil via a BEMF amplifier and a level-shift section.

4. The vibration linear actuating device of claim 1, wherein the driver further includes a timing adjuster disposed between the zero-cross detector and the output controller.

5. The vibration linear actuating device of claim 4, wherein the timing adjuster includes a phase locked loop.

6. The vibration linear actuating device of claim 1, wherein the output controller includes a pulse width modulator.

7. A method of driving a vibrating linear actuator, the actuator comprising:
    a mover having a permanent magnet magnetized in a radial direction;
    a stator having a coil and facing the permanent magnet; and
    an elastic body for coupling the stator to the mover and energizing the mover toward a center of the stator, the method comprising the steps of:
    (a) determining a zero-cross point of back electromotive force generated in the coil;
    (b) determining a period for powering the coil in every cycle;
    (c) determining a period for powering the coil at starting time;
    (d) counting step (b) based on the determined result of step (a); characterized by the additional step of
    (e) starting to count depending on the judging result at step (a), wherein the judging result at step (a) is kept invalidated until counting up at step (e).

8. The method of driving a vibrating linear actuator of claim 7 further comprising step (f) for counting for itself based on the determined result of step (a), wherein step (c) starts counting when step (f) counts up.

9. The method of driving a vibrating linear actuator of claim 8, wherein step (f) is reset depending on a next determined result.

10. A portable information apparatus comprising:
    (a) a board;
    (b) a vibrating linear actuator mounted to the board; the actuator including:
    (b-1) a mover having a permanent magnet magnetized in a radial direction;

(b-2) a stator having a coil and facing the permanent magnet; and
(b-3) an elastic body for coupling the stator to the mover and energizing the mover toward a center of the stator;
(c) a driver mounted to the board, the driver including:
(c-1) a driving section having a switching element for powering the coil;
(c-2) an output controller for controlling the switching element; and
(c-3) a zero-cross detector for detecting a zero-cross point of back electromotive force (BEMF) generated in the coil and outputting a zero-cross signal;
wherein the driver transmits the zero-cross signal to the output controller and powers the coil in one direction for vibrating the mover in corporation with the elastic body,
characterized by
(c-4) a zero-cross monitor interposed between the zero-cross detector and the output controller,
the zero-cross monitor monitoring the zero-cross signal and prohibiting acceptance of a next zero-cross signal for a given time after input of the zero-cross signal.

11. The portable information apparatus of claim 10, wherein the vibrating linear actuator generates vibrations with a maximum amplitude in a vertical direction to the board.

12. The portable information apparatus of claim 10, wherein the driver transmits a re-starter signal to the output controller when the zero-cross signal is halted for a given time.

13. The portable information apparatus of claim 10, wherein the zero-cross detector is coupled to the coil via a BEMF ampler and a level-shift section.

14. The portable information apparatus of claim 10, wherein the driver further includes a timing adjuster disposed between the zero-cross detector and the output controller.

15. The portable information apparatus of claim 14, wherein the timing adjuster includes a phase locked loop.

CERTIFICATE OF CORRECTION (continued)
U.S. Pat. No. 7,268,503 B2

16.    The portable information apparatus of claim 10, wherein the output controller includes a pulse width modulator.

This certificate supersedes the Certificate of Correction issued March 23, 2010.

Signed and Sealed this

Twentieth Day of April, 2010

David J. Kappos
*Director of the United States Patent and Trademark Office*

United States Patent
Yamasaki et al.

(10) Patent No.: US 7,268,503 B2
(45) Date of Patent: Sep. 11, 2007

(54) VIBRATION LINEAR ACTUATING DEVICE, METHOD OF DRIVING THE SAME DEVICE, AND PORTABLE INFORMATION APPARATUS USING THE SAME DEVICE

(75) Inventors: Hirokazu Yamasaki, Katano (JP); Koji Kameda, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 451 days.

(21) Appl. No.: 10/508,992

(22) PCT Filed: Apr. 2, 2003

(86) PCT No.: PCT/JP03/04200

§ 371 (c)(1),
(2), (4) Date: Sep. 27, 2004

(87) PCT Pub. No.: WO03/085809

PCT Pub. Date: Oct. 16, 2003

(65) Prior Publication Data

US 2005/0162105 A1    Jul. 28, 2005

(30) Foreign Application Priority Data

Apr. 4, 2002 (JP) .......................... 2002-102352

(51) Int. Cl.
H02P 1/00 (2006.01)
(52) U.S. Cl. .............. 318/114; 318/459; 318/500; 318/254; 388/928.1
(58) Field of Classification Search ........... 318/254, 318/138, 439, 114, 115, 459, 500; 388/928.1
See application file for complete search history.

(56) References Cited

U.S. PATENT DOCUMENTS

| 5,682,132 | A |  | 10/1997 | Hidetoshi et al. |  |
|---|---|---|---|---|---|
| 6,996,228 | B1 | * | 2/2006 | Niemitalo | 379/374.03 |
| 2001/0017527 | A1 | * | 8/2001 | Lambert et al. | 318/114 |
| 2003/0052628 | A1 | * | 3/2003 | Kataoka | 318/114 |
| 2004/0007998 | A1 | * | 1/2004 | Yasohara et al. | 318/437 |

FOREIGN PATENT DOCUMENTS

| EP | 0 726 394 A | 8/1996 |
|---|---|---|
| EP | 0 952 663 A | 10/1999 |
| JP | 11-197601 | 7/1999 |
| JP | 2000-014190 | 1/2000 |
| JP | 2001-025706 | 1/2001 |
| JP | 2001-520860 | 10/2001 |

* cited by examiner

Primary Examiner—Rina Duda
(74) Attorney, Agent, or Firm—RatnerPrestia

(57) ABSTRACT

A vibration linear actuating device includes a vibrating linear actuator and a driver (52) for driving actuator. Actuator includes mover having permanent magnet magnetized in a radial direction, stator having coil (2) and facing the permanent magnet, and elastic body for coupling stator to mover. The driver includes driving section having switching element (Q5) for powering coil (2), output controller (27) for controlling switching element (Q5), zero-cross detector (25) for detecting a zero-cross point of back electromotive force generated in coil (2) and having an output to be fed back to the output controller (27). In this structure, the driver powers coil (2) in one way to keep mover vibrating in corporation with elastic body.

16 Claims, 12 Drawing Sheets